US008025997B2

(12) United States Patent
Kim

(10) Patent No.: US 8,025,997 B2
(45) Date of Patent: Sep. 27, 2011

(54) BATTERY PACK

(75) Inventor: Hyun-Joong Kim, Cheonan-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 779 days.

(21) Appl. No.: 10/868,885

(22) Filed: Jun. 17, 2004

(65) Prior Publication Data

US 2005/0079412 A1    Apr. 14, 2005

(30) Foreign Application Priority Data

Jun. 19, 2003  (KR) .................. 10-2003-0039956

(51) Int. Cl.
 *H01M 2/02*   (2006.01)
 *H01M 2/04*   (2006.01)
(52) U.S. Cl. .................. 429/162; 429/176; 429/185
(58) Field of Classification Search .................. 429/176, 429/178, 185, 162; 206/703–705
See application file for complete search history.

(56) References Cited

U.S. PATENT DOCUMENTS

| | | | | |
|---|---|---|---|---|
| 4,623,599 A | * | 11/1986 | Vourlis | 429/174 |
| 5,418,088 A | * | 5/1995 | Alexandres | 429/175 |
| 6,004,690 A | * | 12/1999 | Van Lerberghe | 429/100 |
| 6,296,967 B1 | * | 10/2001 | Jacobs et al. | 429/93 |
| 6,489,054 B2 | * | 12/2002 | Cheiky et al. | 429/185 |
| 6,503,656 B1 | * | 1/2003 | Bannai et al. | 429/162 |
| 2005/0164080 A1 | * | 7/2005 | Kozu et al. | 429/176 |

FOREIGN PATENT DOCUMENTS

| | | | |
|---|---|---|---|
| JP | 61085766 A | * | 5/1986 |
| JP | 08-501654 T | | 2/1996 |
| JP | 08-298103 | | 11/1996 |
| JP | 2001-307703 | | 11/2001 |
| JP | 2002-117815 | | 4/2002 |
| JP | 2002-117819 | | 4/2002 |
| JP | 2002-216725 | | 8/2002 |
| JP | 2002-172676 | | 1/2004 |
| JP | 2004-022524 | | 1/2004 |
| JP | 2004-327176 | | 11/2004 |
| JP | 2004-356027 | | 12/2004 |
| WO | WO 03/049213 A1 | | 6/2003 |

OTHER PUBLICATIONS

English translation of Japanese Patent Publication No. 61-085766 with certificate of translation.

* cited by examiner

*Primary Examiner* — Gregg Cantelmo
(74) *Attorney, Agent, or Firm* — Robert E. Bushnell, Esq.

(57) ABSTRACT

A secondary battery comprises a case which includes a frame and a film covering an opening of the frame to form a space inside the frame, and a unit battery cell placed in the space inside the case. The frame has a higher hardness than the film. The frame can be formed with plastic or steel, and the film can be formed of polycarbonate (PC), polyethylene (PE), polyethylene terephthalate (PET), or polyvinylchloride (PVC). The thickness of the film is maintained within 0.03 to 0.3 mm, and a mark can be formed on the film. A contact terminal is formed on the case, and the contact terminal is electrically connected to a unit battery cell so as to connect the battery pack to an applied device. The frame can be formed in a divided manner, and the film can be bound to one surface placed adjacent to the opening of the frame, or on the latter surface and an outer circumferential surface of the frame. The frame can be formed as one body, and the film can be bound to a surface placed adjacent to the frame.

20 Claims, 4 Drawing Sheets

BATTERY PACK

CLAIM OF PRIORITY

This application makes reference to, incorporates the same herein, and claims all benefits accruing under 35 U.S.C. §119 from an application for BATTERY PACK earlier filed in the Korean Intellectual Property Office on 19 Jun. 2003 and there duly assigned Serial No. 2003-0039956.

BACKGROUND OF THE INVENTION

1. Field of the Invention

The present invention relates to a battery pack, and more particularly, to a case structure of a battery pack for sealing a battery assembly.

2. Description of the Related Art

Unlike a primary battery, a secondary battery may be recharged, and may be made into a battery pack and used as a power source for various portable electronic devices, such as cellular phones, laptop computers, and camcorders.

Among secondary batteries, the lithium secondary battery is more suitable for portable electronic devices since it has high driving voltage and high energy density per unit weight. The lithium polymer battery, which is a lithium battery which uses a polymer electrolyte, has the advantage of making portable electronic devices slim and lightweight since it is flexible so as to take on various shapes, and since it is light in weight.

A typical battery pack is basically formed with a unit battery cell which includes an electrode assembly in which a positive plate and a negative plate are wound with a separating plate, and a case or can (hereinafter "the inner case") which seals the electrode assembly while exposing a positive terminal and a negative terminal. While the unit battery cell is equipped with safety devices, such as a PCM (protecting circuit module), it is assembled into another case (hereinafter "the outer case") so as to be sealed, thereby providing a battery pack.

When a battery pack with the above structure is applied to portable electronic devices, although it is important to provide high efficiency characteristics of the battery itself as a power source, the battery pack should also provide beneficial mechanical aspects, i.e., safety and strength, so as to protect the unit battery cell.

In addition, in order to keep the portable electronic devices slim, slimness of the battery itself is required. To do this, the structure of the battery pack should be such that the outer case structure forming the shape of the pack is a key factor with respect to slimness of the battery pack.

As far as is known, there are two types of outer cases for a battery pack: a label type and an assembly type. In the label type outer case, the inner case is wound with a film type insulation tape; in the assembly type outer case, the outer case is detachable and is made of a material of substantial hardness, such as plastic and steel, and the case receives the unit battery cells inside thereof in order to seal the case. In the latter respect, if the case is made of steel, an insulating tape is adhered to the outward surface of the outer case.

When comparing the above two types in terms of safety, strength and slimness of the battery pack, the label type has the advantage of slimness, but if the unit battery cell is formed in a pouch shape, it has disadvantages in the areas of safety and strength since it is difficult to obtain a predetermined shape of the unit battery cell.

The assembly type has the advantages of safety and strength of the battery pack since its outer case is made of a hard material, but it has a limitation with respect to slimness. The reason is that it is difficult to decrease the thickness of the plastic outer case, which is manufactured by typical molding methods, below a certain thickness, for example 0.4 mm. The steel outer case has the same difficulty with regard to thickness.

In addition to the difficulty in achieving slimness, the assembly type outer case made of steel causes an inconvenience in use due to the increase in weight of the battery pack. Moreover, since such an outer case has a high risk of short circuit when the unit battery cell is placed in it, its circuit structure is unstable. Furthermore, since the assembly type outer case needs an additional step of binding insulation tape as described above, its manufacturing process is complicated.

SUMMARY OF THE INVENTION

The present invention enables a battery pack to be slim and lightweight while ensuring excellent safety and strength.

A battery pack according to the present invention comprises a case which includes a frame and a film covering an opening of the frame to form a space inside the frame, and a unit battery cell placed in the space inside the case.

The frame has a higher hardness than the film.

The frame can be formed with plastic or steel, and the film can be formed of polycarbonate (PC), polyethylene (PE), polyethylene terephthalate (PET), or polyvinylchloride (PVC).

The thickness of the film is maintained within 0.03 to 0.3 mm, and a mark can be formed on the film.

A contact terminal is formed on the case, and the contact terminal is electrically connected to a unit battery cell so as to connect the battery pack to an applied device.

The frame can be formed in a divided manner, and the film can be bound to one surface placed adjacent to the opening of the frame, or on the latter surface and an outer circumferential surface of the frame.

The frame can be formed as one body, and the film can be bound to a surface placed adjacent to the frame.

The film can be bound to the frame by an adhesive bonding method.

In addition, a battery pack of the present invention comprises a battery assembly which includes an electrode assembly having a positive plate, a negative plate and a separating plate, and a container receiving the electrode assembly inside thereof, and an inner case which receives the battery assembly while exposing an exterior contact terminal electrically connected to the positive plate and negative plate, and an outer case which has a first portion for receiving the battery assembly with at least one opening, and a second portion which has less thickness than the first portion, and which covers the opening to be joined to the first portion, The first portion is formed with plastic or steel, and a plurality of openings exposing the exterior contact terminal are formed on the first portion.

The second portion is formed with a flexible film, and it can be formed of polycarbonate (PC), polyethylene (PE), polyethylene terephthalate (PET), or polyvinylchloride (PVC).

A mark can be formed on the second portion, and the first portion can be formed with a body which includes a receiving portion for receiving the battery assembly and a sealing portion joined to the second portion.

The body can be divisionally formed, and the second portion can be joined to the sealing portion by an adhesive bonding method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Reference will now be made in detail to the embodiments of the present invention, examples of which are illustrated in the accompanying drawings. The embodiments are described below to explain the present invention by referring to the figures.

Figure 1:
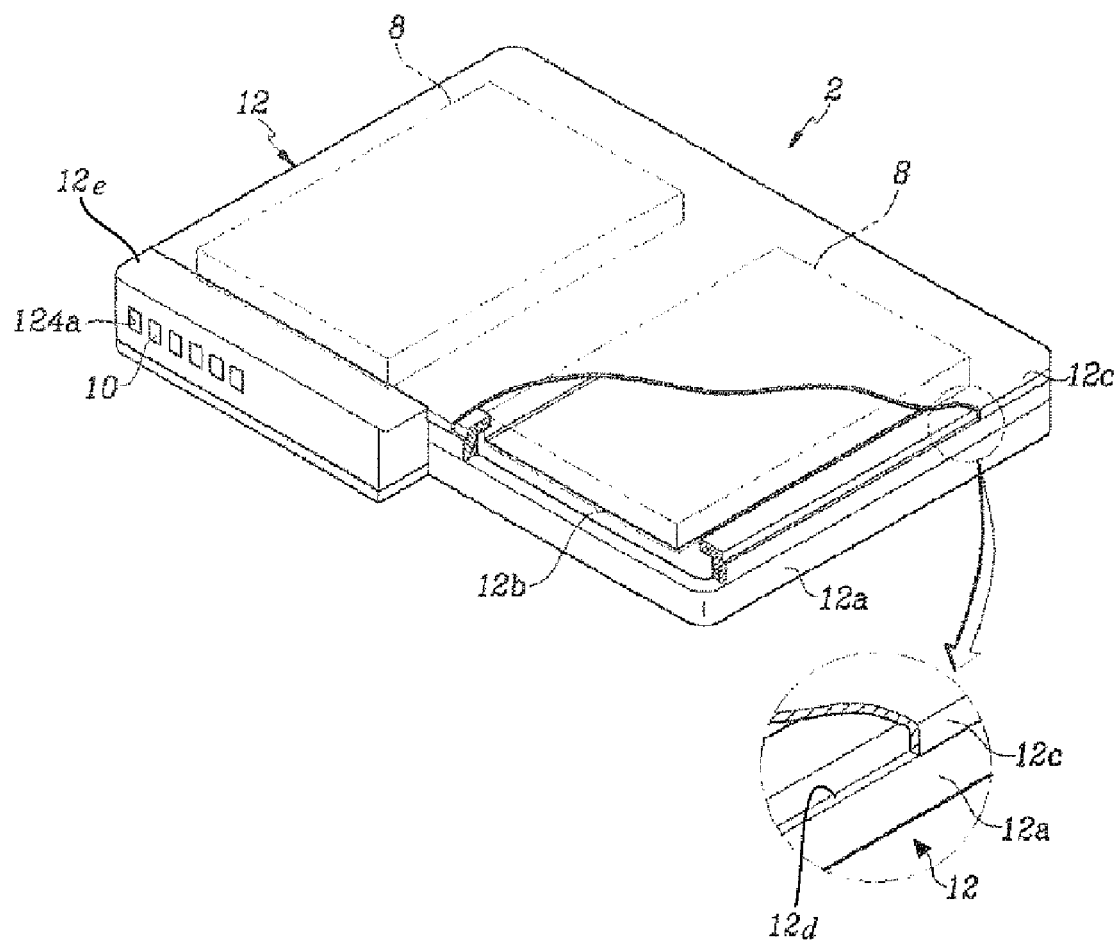
FIG. 1 is a partial cut perspective view of a battery pack according to a first embodiment of the present invention.
Figure 2:
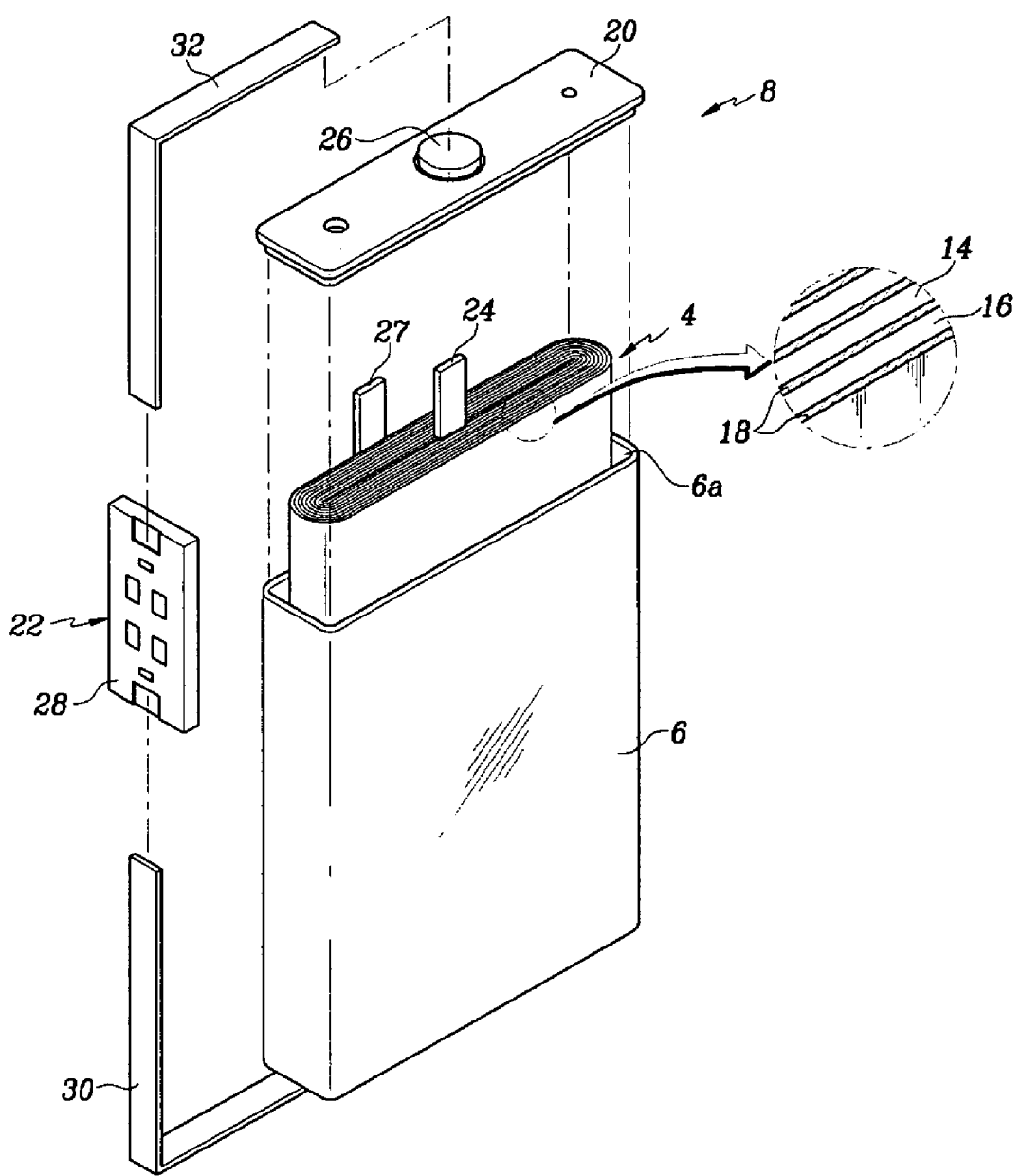
FIG. 2 is an exploded perspective view of a battery assembly according to the first embodiment of the present invention.

FIG. 1 is a partial cut perspective view of a battery pack according to a first embodiment of the present invention, and FIG. 2 is an exploded perspective view of the battery assembly (or a unit battery cell, hereinafter "a batter assembly") according to the first embodiment of the present invention.

With reference to the drawings, the battery pack 2 comprises a battery assembly 8 in which a container 6 is sealed by placing an electrode assembly 4 inside the container 6, and a case 12 which receives the battery assembly 8 while exposing an exterior contact terminal 10.

In the present invention, the case 12 is formed as a combination with one portion of hard material and another portion of flexible material, thereby providing safety and strength required for the battery pack 2, while also enabling the battery pack to be slim and lightweight.

With regard to the battery assembly 8, a square type battery, a pouch type battery, or the like can be used for the battery assembly 8, and the following will describe the square type battery as an example.

With reference to FIG. 2, the battery assembly 8 comprises an electrode assembly 4 with a positive plate 14 and a negative plate 16 wound in a jelly roll configuration based on a separating plate 18, a container 6 receiving the electrode assembly 4 inside thereof, a cap assembly 20 fixed to an opening 6a of the container 6 so as to seal the same, and a safety device 22 provided at an exterior side of the container 6.

The negative plate 16 is connected to a negative terminal 26 of a cap assembly 20 through a negative lead 24, and the positive plate 14 is connected to the cap assembly 20 through a positive lead 27, and thereby the cap assembly 20 and the container 6 can function as a positive terminal. The cap assembly 20 and the negative terminal 26 maintain a state of insulation through a gasket (not shown).

Further, the safety device 22 includes a PCM (protecting circuit module) 28, a first lead plate 30 connecting a lower surface of the container 6 and the PCM 28, and a second lead plate 32 connecting the negative terminal 26 and the PCM 28, and it performs cutoff of current when voltage of the battery assembly 8 abruptly rises, thereby preventing the battery assembly 8 from exploding.

The safety device 22 can further include a generally known PTC (positive temperature coefficient) element (not shown).

Figure 3:
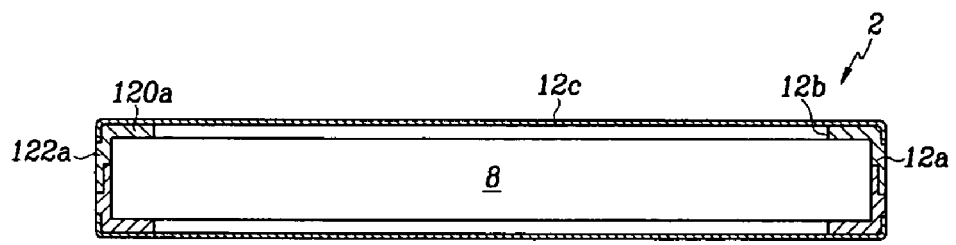
FIG. 3 is a cross-sectional view of the battery pack according to the first embodiment of the present invention.

FIG. 3 is a cross-sectional view of the battery pack of FIG. 1, and the structure of the case will be explained in the following with reference to FIG. 1 and FIG. 3.

The case 12 includes a frame 12a which has the shape of a predetermined configuration according to the exterior configuration of the battery assembly 8, for example, square. The frame 12a is formed with at least one opening 12b, and in the present embodiment, the frame 12a is formed such that the openings 12b are placed opposite each other, in the middle of which is the battery assembly 8 which is placed inside the frame 12a.

The opening 12b is covered with a film 12c of the case 12. That is, the film 12c is bound to the frame 12a (for example, by adhesive bonding) to form the case 12 together with the frame 12a while it covers the opening 12b. Alternatively, or additionally, the film 12c can be bound to the outer circumferential surface of the frame 12a and be disposed within a recess 12d as provided in the frame 12a, as shown in the magnified view in FIG. 1. The recess 12d may include two connecting side walls running along the length of the frame 12a.

In the case 12, the frame 12a is formed of hard material, such as plastic and steel, and when formed with plastic, it can be manufactured by general molding methods, its thickness being about 0.4 mm. The case 12 includes a housing unit 12e not covered by the film and extending from a side portion of the frame 12a. The housing unit 12e has a plurality of openings 124a (FIG. 1), and a plurality of exterior contact terminals 10 which are exposed outside the case 12 and electrically connected to the positive plate 14 and the negative plate 16 of the battery assembly 8 through the openings 124a.

The film 12c is made of softer material than the frame 12a, and its thickness is also thinner than that of the frame 12a so that it is flexible.

In more detail, the film 12c is formed of polycarbonate (PC), polyethylene (PE), polyethylene terephthalate (PET), or polyvinylchloride (PVC), and it has a thickness of about 0.03 to 0.3 mm so as to form a thin film.

When the film 12c is bound to the frame 12a, the film 12c adheres to one surface 120a of the frame 12a adjacent to the opening 12b and an outer circumferential surface 122a of the frame 12a as shown in FIG. 3, and an adhesive surface for the film 12c is separately formed on the outer circumferential surface 122a.

The portion of the frame 12a to which the film 12c adheres is not limited to the above structure. That is, as shown in FIG. 4, the film 12c can be adhered to the one surface 120a of the frame 12a adjacent to the opening 12b.

Figure 4:
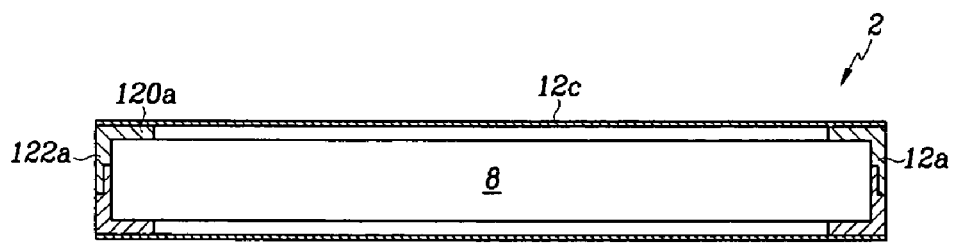
FIG. 4 is a cross-sectional view of a battery pack according to a second embodiment of the present invention.
Figure 5:
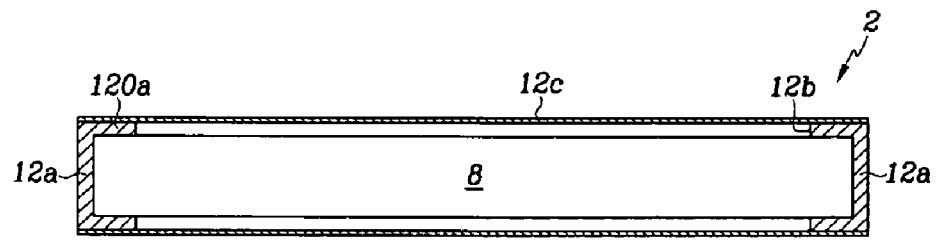
FIG. 5 is a cross-sectional view of a battery pack according to a third embodiment of the present invention.

The frame 12a shown in FIG. 3 and FIG. 4 is divided into two parts which are combined with each other, but this is not essential. The frame 12a can be formed as one body as shown in FIG. 5. In the embodiment shown in FIG. 5, the film 12c is also joined to the one surface 120a adjacent to the opening 12b of the frame 12a by the adhesive bonding method.

Figure 6:
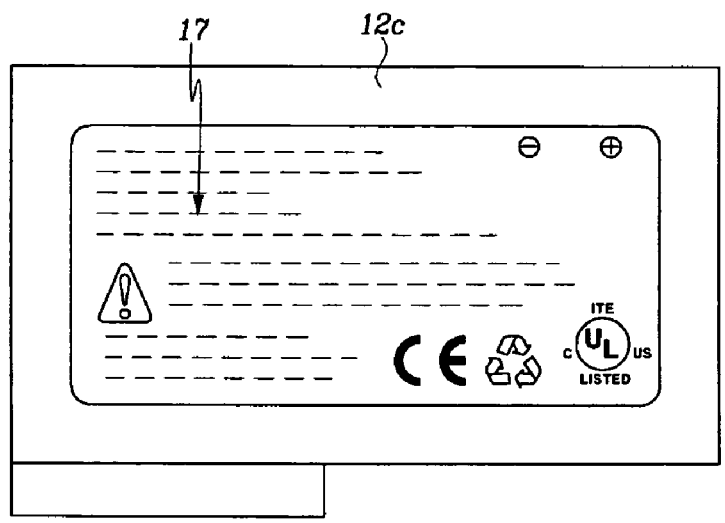
FIG. 6 is a plan view used to explain a film according to an embodiment of the present invention.

As shown in FIG. 6, a mark 17 such as a product specification or bar code is formed on one surface of the film 12c (the outer surface of the case).

In the battery pack 2 with the above structure, the case 12 is formed by a combination of a first portion, i.e. the frame 12a, which is made of harder material than the film 12c, and a second portion of a thin film, i.e. the film 12c, which is soft and thin. That is, as the frame 12a is formed with greater hardness than the film 12c, the frame 12a can provide excellent safety and strength, and the film 12c can reduce the overall thickness, thereby enabling the battery pack 2 to be slim and lightweight.

Moreover, as the battery pack 2 is formed with the film 12c which has the pre-printed mark 17 on its surface, it is not necessary to separately bind a label with a printed pattern corresponding to the mark on the case of the battery pack, thereby enabling the manufacturing process for battery packs to be simplified.

When the case 12 is formed by binding each of the frames 12a which are divided into two parts, various methods (for example, welding, assembling and adhesive bonding methods, etc.) can be used as a joining method for the frames 12a.

Figure 7:
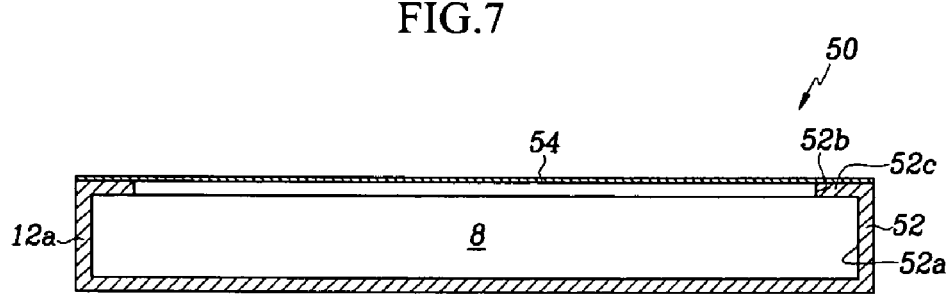
FIG. 7 is a cross-sectional view of a battery pack according to a fourth embodiment of the present invention.
Figure 8:
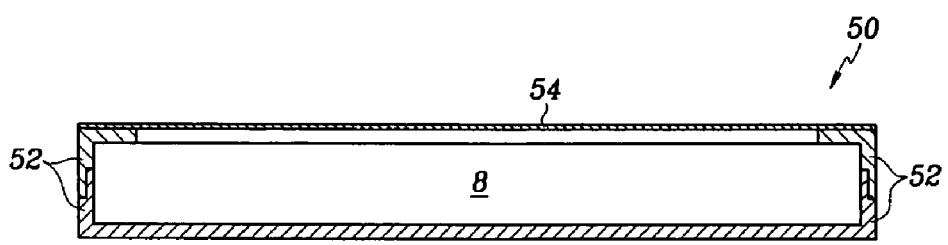
FIG. 8 is a cross-sectional view of a battery pack according to a fifth embodiment of the present invention.

FIG. 7 and FIG. 8 are cross-sectional views of other embodiments of the present invention.

In the battery pack 50 shown in FIG. 7, a body 52 with receiving portion 52a to receive the battery assembly 8 is formed as the first portion of the above described embodiments. As shown in the drawing, in this body 52, an opening 52b is formed only on the side where film 54 adheres (i.e., the second portion described above), and the film 54 is joined to a sealing portion 52c of the body 52 adjacent to the opening 52b by use of adhesives or similar means.

Since the basic characteristics of the body 52 and the film 54 are the same as those of the frame and film described above, a detailed explanation thereof will not be provided.

FIG. 8 shows an embodiment in which the body 52 in FIG. 7 is divided into two parts. That is, in this embodiment, the film 54 joined to the body 52 is bound to the upper portion (as seen in the drawing) of the body 52 to form a case of the battery pack, and to form the upper body 52 where the film 54 is adhered can be carried out by use of an in-mold process that simultaneously injects the plastic and the transfer film. The cases shown in FIG. 3 and FIG. 4 can also be formed by the in-mold process.

As described in the above, the battery pack according to the present invention reduces the thickness and weight of the battery while providing excellent safety and strength, thereby enabling the battery pack to be slim and lightweight. In addition, it is possible to increase the capacity of the battery assembly by as much as the thickness of the battery pack is decreased, thereby increasing the efficiency of the battery. Moreover, this can reduce the number of manufacturing steps for assembly since it is not necessary to separately bind a label to the outer surface of the battery pack.

Although a few embodiments of the present invention have been shown and described, it will be appreciated by those skilled in the art that changes may be made in this embodiment without departing from the principles and spirit of the invention, the scope of which is defined in the appended claims and their equivalents.

What is claimed is:

1. A battery pack, comprising:
a case including a frame, a film covering an opening of the frame to form a space inside the frame, and a housing unit not covered by the film; and
a unit battery cell placed in the space inside the frame;
wherein the film is disposed on a surface of the frame adjacent to the opening and an outer circumferential surface of the frame;
wherein a recess, having a depth equal to a thickness of the film, is formed on the outer circumferential surface of the frame immediately adjacent to the opening so that the film is bound to the outer circumferential surface of the frame and is disposed within the recess; and
wherein the housing unit extends from a side portion of the frame and houses a plurality of contact terminals, the contact terminals being electrically connected to the unit battery cell so as to connect the battery pack and an applied device via a plurality of openings in the housing unit.

2. The battery pack of claim 1, wherein the frame has a hardness which is greater than a hardness of the film.

3. The battery pack of claim 2, wherein the frame is formed of one of plastic and steel.

4. The battery pack of claim 1, wherein the film is formed of a material selected from the group consisting of polycarbonate (PC), polyethylene (PE), polyethylene terephthalate (PET), and polyvinylchloride (PVC).

5. The battery pack of claim 1, wherein the film thickness is in a range of 0.03 to 0.3 mm.

6. The battery pack of claim 1, wherein a mark is formed on the film.

7. The battery pack of claim 1, wherein the frame is formed in a divided manner.

8. The battery pack of claim 7, wherein the film is disposed on a surface placed adjacent to the frame and another circumferential surface of the frame.

9. The battery pack of claim 1, wherein the frame is formed as one body.

10. The battery pack of claim 9, wherein the film is bound to the frame by the adhesive bonding method.

11. The battery pack of claim 10, wherein the film is bound to a surface placed adjacent to the frame.

12. A battery pack, comprising:
a battery assembly including an electrode assembly having a positive plate, a negative plate and a separating plate, and a container for receiving the electrode assembly inside the container; and
a case for receiving the battery assembly, and for exposing a plurality of exterior contact terminals electrically connected to the positive plate and the negative plate;
wherein the case has a first portion for receiving the battery assembly with at least one opening formed thereon, a second portion joined to the first portion so as to cover said at least one opening, the second portion having a thickness which is less than a thickness of the first portion, and a third portion adjacent to a portion of an outer circumferential surface of the first portion and not covered by the second portion, the third portion housing the plurality of contact terminals so as to connect the battery pack and an applied device via a plurality of openings in the third portion;
wherein the second portion is disposed on a surface of the first portion adjacent to the opening and the outer circumferential surface of the first portion; and
wherein a recess is formed in the outer circumferential surface of the first portion so that the second portion is bound to the outer circumferential surface of the frame and is disposed within the recess.

13. The battery pack of claim 12, wherein the first portion is formed of one of plastic and steel.

14. The battery pack of claim 12, wherein the second portion is formed of a flexible film.

15. The battery pack of claim 14, wherein the flexible film is made of a material selected from the group consisting of polycarbonate (PC), polyethylene (PE), polyethylene terephthalate (PET), and polyvinylchloride (PVC).

16. The battery pack of claim 12, wherein a mark is formed on the second portion.

17. The battery pack of claim 12, wherein the first portion has a body including a receiving portion for receiving the battery assembly and a sealing portion which is joined to the second portion.

18. The battery pack of claim 17, wherein the body is formed in a divided manner.

19. The battery pack of claim 17, wherein the second portion is joined to the sealing portion by an adhesive bonding.

20. The battery pack of claim 12, wherein:

the case comprises a frame, the second portion comprises a film covering an opening of the frame, and the third portion comprises a housing unit;

the recess, having a depth equal to a thickness of the film, is formed on the outer circumferential surface of the frame immediately adjacent to the opening so that the film is embedded in the recess; and wherein the housing unit extends from a side portion of the frame and houses a plurality of contact terminals, the contact terminals being electrically connected to the unit battery cell so as to enable connection of the battery assembly in a battery pack and an applied device via a plurality of openings in the housing unit.

* * * * *